US008402831B2

(12) United States Patent
Kupnik et al.

(10) Patent No.: US 8,402,831 B2
(45) Date of Patent: Mar. 26, 2013

(54) MONOLITHIC INTEGRATED CMUTS FABRICATED BY LOW-TEMPERATURE WAFER BONDING

(75) Inventors: Mario Kupnik, Mountain View, CA (US); Butrus T. Khuri-Yakub, Palo Alto, CA (US)

(73) Assignee: The Board of Trustees of the Leland Standford Junior University, Palo Alto, CA (US)

( * ) Notice: Subject to any disclaimer, the term of this patent is extended or adjusted under 35 U.S.C. 154(b) by 284 days.

(21) Appl. No.: 12/660,807

(22) Filed: Mar. 3, 2010

(65) Prior Publication Data

US 2010/0225200 A1 Sep. 9, 2010

Related U.S. Application Data

(60) Provisional application No. 61/209,450, filed on Mar. 5, 2009.

(51) Int. Cl.
*G01H 11/00* (2006.01)
*H02N 11/00* (2006.01)
*H04R 31/00* (2006.01)

(52) U.S. Cl. ........................ 73/649; 73/514.32; 310/300

(58) Field of Classification Search .................... 73/649, 73/514.32; 29/594; 310/300
See application file for complete search history.

(56) References Cited

U.S. PATENT DOCUMENTS

| | | | | |
|---|---|---|---|---|
| 3,397,278 | A * | 8/1968 | Pomerantz | 257/650 |
| 6,430,109 | B1 * | 8/2002 | Khuri-Yakub et al. | 367/181 |
| 6,645,145 | B1 * | 11/2003 | Dreschel et al. | 600/443 |
| 6,836,020 | B2 * | 12/2004 | Cheng et al. | 257/774 |
| 6,933,164 | B2 | 8/2005 | Kubena | |
| 7,321,181 | B2 * | 1/2008 | Khuri-Yakub et al. | 310/320 |
| 7,530,952 | B2 * | 5/2009 | Huang et al. | 600/459 |
| 7,745,248 | B2 * | 6/2010 | Park et al. | 438/50 |
| 2004/0235266 | A1 | 11/2004 | Tong | |
| 2005/0177045 | A1 | 8/2005 | Degertekin et al. | |
| 2006/0075818 | A1 | 4/2006 | Huang et al. | |
| 2007/0180916 | A1 * | 8/2007 | Tian et al. | 73/649 |
| 2007/0242567 | A1 * | 10/2007 | Daft et al. | 367/140 |
| 2009/0126183 | A1 * | 5/2009 | Chang et al. | 29/594 |
| 2009/0142872 | A1 | 6/2009 | Park et al. | |
| 2009/0182229 | A1 * | 7/2009 | Wodnicki | 600/437 |
| 2010/0280388 | A1 * | 11/2010 | Huang | 600/459 |

FOREIGN PATENT DOCUMENTS

WO WO 2007/005036 1/2007

OTHER PUBLICATIONS

Huang et al., "Fabricating Capacitive Micromachined Ultrasonic Transducers with Wafer-Bonding Technology", 2003, pp. 128-137, Journal of Microelectromechanical Systems v12n2.

(Continued)

*Primary Examiner* — J M Saint Surin
(74) *Attorney, Agent, or Firm* — Lumen Patent Firm

(57) ABSTRACT

Low temperature wafer bonding (temperature of 450° C. or less) is employed to fabricate CMUTs on a wafer that already includes active electrical devices. The resulting structures are CMUT arrays integrated with active electronics by a low-temperature wafer bonding process. The use of a low-temperature process preserves the electronics during CMUT fabrication. With this approach, it is not necessary to make compromises in the CMUT or electronics designs, as is typical of the sacrificial release fabrication approach. Various disadvantages of sacrificial release, such as low process control, poor design flexibility, low reproducibility, and reduced performance are avoided with the present approach. With this approach, a CMUT array can be provided with per-cell electrodes connected to the substrate integrated circuitry. This enables complete flexibility in electronically assigning the CMUT cells to CMUT array elements.

20 Claims, 7 Drawing Sheets

OTHER PUBLICATIONS

Eccardt et al., "Micromachined ultrasound transducers with improved coupling factors from a CMOS compatible process", 2000, pp. 774-780, Ultrasonics v 38.
Noble et al., "Low-Temperature Micromachined cMUTs with Fully-Integrated Analogue Front-End Electronics", 2002, pp. 1045-1050, 2002 IEEE Ultrasonics Symposium.
Daft et al., "Microfabricated Ultrasonic Transducers Monolithically Integrated with High Voltage Electronics", 2004, pp. 493-496, 2004 IEEE Ultrasonics Symposium.
Daft et al., "cMUTs and electronics for 2D and 3D imaging: Monolithic integration, in-handle chip sets and system implications", 2005, pp. 463-474, 2005 IEEE Ultrasonics Symposium.

* cited by examiner

MONOLITHIC INTEGRATED CMUTS FABRICATED BY LOW-TEMPERATURE WAFER BONDING

CROSS REFERENCE TO RELATED APPLICATIONS

This application claims the benefit of U.S. provisional patent application 61/209,450, filed on Mar. 5, 2009, entitled "Monolithic Integrated CMUTs Fabricated by Low-Temperature Wafer Bonding", and hereby incorporated by reference in its entirety.

FIELD OF THE INVENTION

This invention relates to capacitive micromachined ultrasonic transducer (CMUT) arrays.

BACKGROUND

A capacitive micromachined ultrasonic transducer (CMUT) is a device that is capable of sensing and/or generating acoustic energy. In a CMUT, a membrane layer is present that can be mechanically coupled to the medium of interest (and can therefore act as an acoustic transducer), and which is one electrode of an electrical capacitor. Acoustic deformation of the membrane alters the electrical capacitance, thereby providing an acoustic sensing capability. Conversely, an applied electric voltage on the capacitor can alter the position of the membrane, thereby providing an acoustic generation capability. It is often desirable to provide a large array of CMUT devices in practice. For example, applications such as medical imaging frequently require large CMUT arrays.

Two basic approaches are known for making CMUT devices and CMUT arrays. The first approach can be referred to as wafer bonding, and includes a wafer bonding step where a wafer containing the CMUT membrane layer is bonded to a second wafer to form the complete CMUT devices. US 2006/0075818 is a representative example of this approach.

The second approach can be referred to as sacrificial release fabrication, where a sequence of processing steps all applied to the same wafer is employed to form the CMUT membrane layer and to release it from surrounding material. US 2005/0177045 is a representative example of this approach.

Thus far, monolithic integration of CMUTs with integrated circuits has only been demonstrated with the sacrificial release CMUT fabrication approach as opposed to the wafer bonding CMUT fabrication approach. The reason for this is that integrated circuits cannot survive the high temperatures of CMUT wafer bonding. The example of US 2006/0075818 describes a CMUT wafer bonding process that includes a 2 hour anneal at 1100° C., which would destroy any conventional integrated circuitry present on the wafers being bonded.

SUMMARY

In the present work, low temperature wafer bonding (temperature of 450° C. or less) is employed to fabricate CMUTs on a wafer that already includes active electrical devices. The resulting structures are CMUT arrays integrated with active electronics by a low-temperature wafer bonding process. The use of a low-temperature process preserves the electronics during CMUT fabrication. With this approach, it is not necessary to make compromises in the CMUT or electronics designs, as is typical of the sacrificial release fabrication approach. For example, the transduction area need not be reduced by the area allocated to electronics, because the electronics can be disposed directly beneath the CMUT array elements. This geometry is difficult or impossible to provide with the sacrificial release fabrication approach. Other disadvantages of sacrificial release, such as low process control, poor design flexibility, low reproducibility, and reduced performance are also avoided with the present approach.

Monolithic CMUT integration provides significant advantages of reduced parasitic capacitance, increased signal/noise, increased bandwidth, increased on-chip processing capability, and reduced off-chip wiring needs. For example, integration of beam forming electronics with a 2-D CMUT array can dramatically reduce the number of external cables needed relative to a configuration having the same 2-D array with all electronics off-chip. With this approach, a CMUT array can be provided with per-cell electrodes connected to the substrate integrated circuitry. This enables complete flexibility in electronically assigning the CMUT cells to CMUT array elements.

DETAILED DESCRIPTION

Figure 1A:
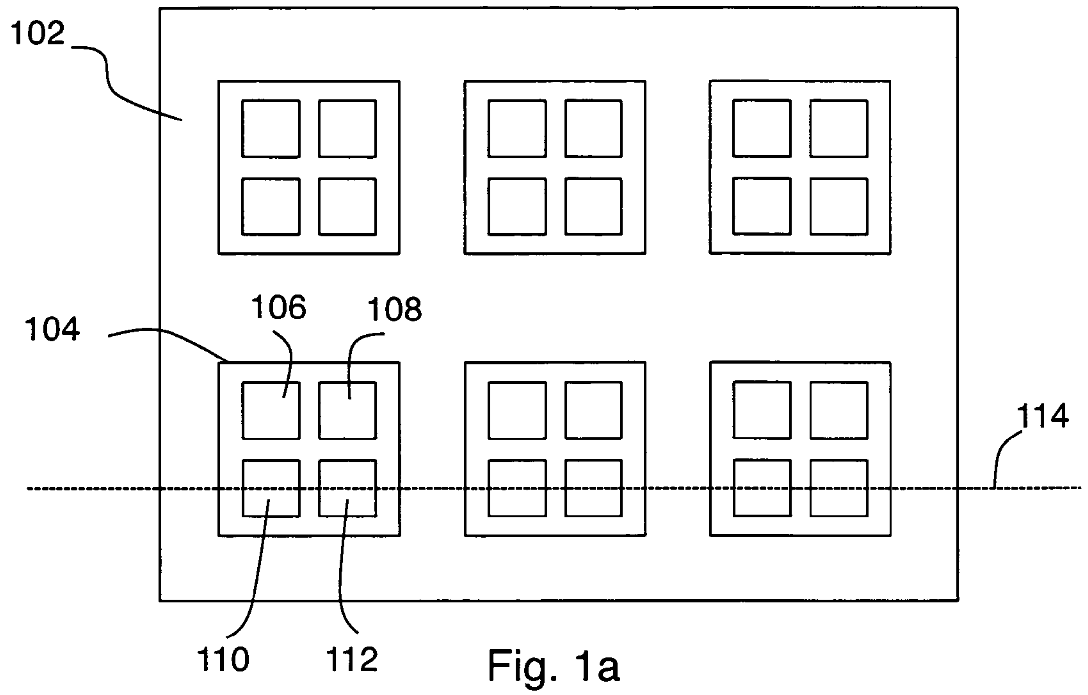
FIGS. 1*a-c* show exemplary embodiments of the invention.
Figure 1B:
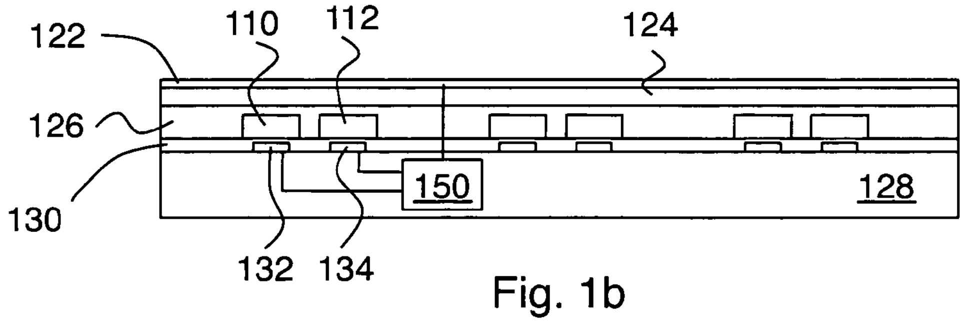
Figure 1C:
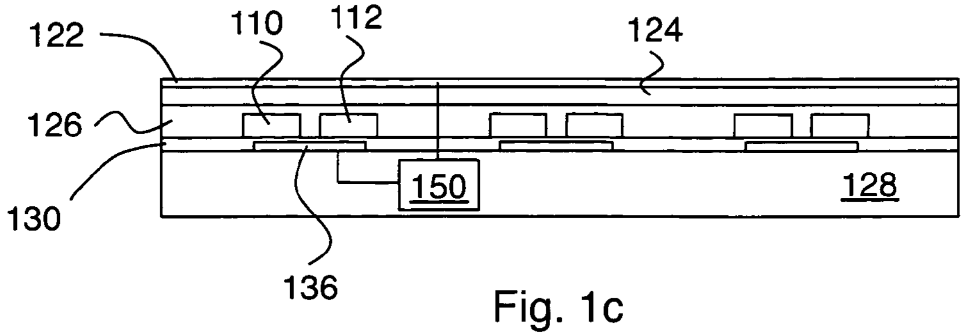

FIGS. 1*a-c* show exemplary embodiments of the invention. FIG. 1*a* is a top view, and FIG. 1*b* is a side view of a first alternative along line 114 of FIG. 1*a*. In this example, a CMUT array 102 includes several array elements, one of which is labeled as 104. Each array element includes one or more cells. In this example, each elements includes 4 cells arranged as a 2×2 cell array. Thus element 104 includes cells 106, 108, 110, and 112. A CMUT cell is a single CMUT capacitor. It is customary to group several CMUT cells into each array element, in order to increase the active capacitance per CMUT array element. More specifically, the cells of a CMUT array element are often electrically connected in parallel to each other, thereby adding up their capacitances. This kind of cell architecture is employed because the alternative of having a single large-area CMUT membrane leads to practical difficulties. Since active capacitance increases as total active CMUT membrane area increases, the significant advantage of disposing electronics beneath the CMUTs as in the present approach is apparent. In contrast, when CMUT arrays fabricated by sacrificial release are integrated with electronics, the electronics and CMUTs are side-by-side, thereby decreasing the fraction of the chip area that can be devoted to the CMUTs.

The side view of FIG. 1*b* shows more details of the CMUT device structure. Here an integrated circuit (IC) substrate 128 includes circuitry having one or more active electrical devices, such as CMOS circuitry. This circuitry is referenced as 150 on FIGS. 1*b-c*. Although this circuitry is typically individually connected to all CMUT array elements, only the connections to a single CMUT array element are shown on FIGS. 1*b-c*, for simplicity. These devices can be connected to CMUT cell electrodes, two of which are referenced as 132 and 134. The CMUT cell electrodes can be buried in an insulating layer 130 (e.g., low-temperature oxide (LTO)). The CMUT membrane layer is referenced as 124. In this example, CMUT membrane layer 124 is a silicon layer, but any other mechanically suitable material can also be employed as the CMUT membrane layer. It can be separated from substrate 128 by a patterned oxide layer 126. Voids in layer 126 define the CMUT cells (e.g., as referenced by 110 and 112). A common top electrode 122 completes the CMUT structures. For example, mechanical deformation of layer 124 in cell 110 causes the distance between electrodes 122 and 132 to change, thereby altering the capacitance. As shown on FIGS. 1*b-c*, top electrode 122 can be connected to circuitry 150, e.g., with a vertical via connection. It is apparent that CMUT membrane layer 124 provides membranes for each cell of the array.

Importantly, the CMUT membrane layer 124 is attached to substrate 128 by a method that includes low-temperature wafer bonding performed after the active electrical devices are present in substrate 128. Various fabrication possibilities will be considered in greater detail below. In this example, layers 126 and 130 are the two layers on either side of the low-temperature bond.

Two electrode configurations are relevant. In the first, substrate 128 provides an individual cell electrode for each cell of the array (e.g., as shown on FIG. 1*b*). In the second, substrate 128 provides a collective electrode for each array element, where each of these collective electrodes is a collective electrode for all cells of the array element. FIG. 1*c* shows an example of this second approach, where collective electrode 136 relates to cells 110, 112 (and 106 and 108) of element 104. Although the use of collective electrodes for elements does not provide as much flexibility as the use of per-cell electrodes, alignment tolerances are increased, and the number of connections needed to the substrate circuitry are reduced.

Figure 2:
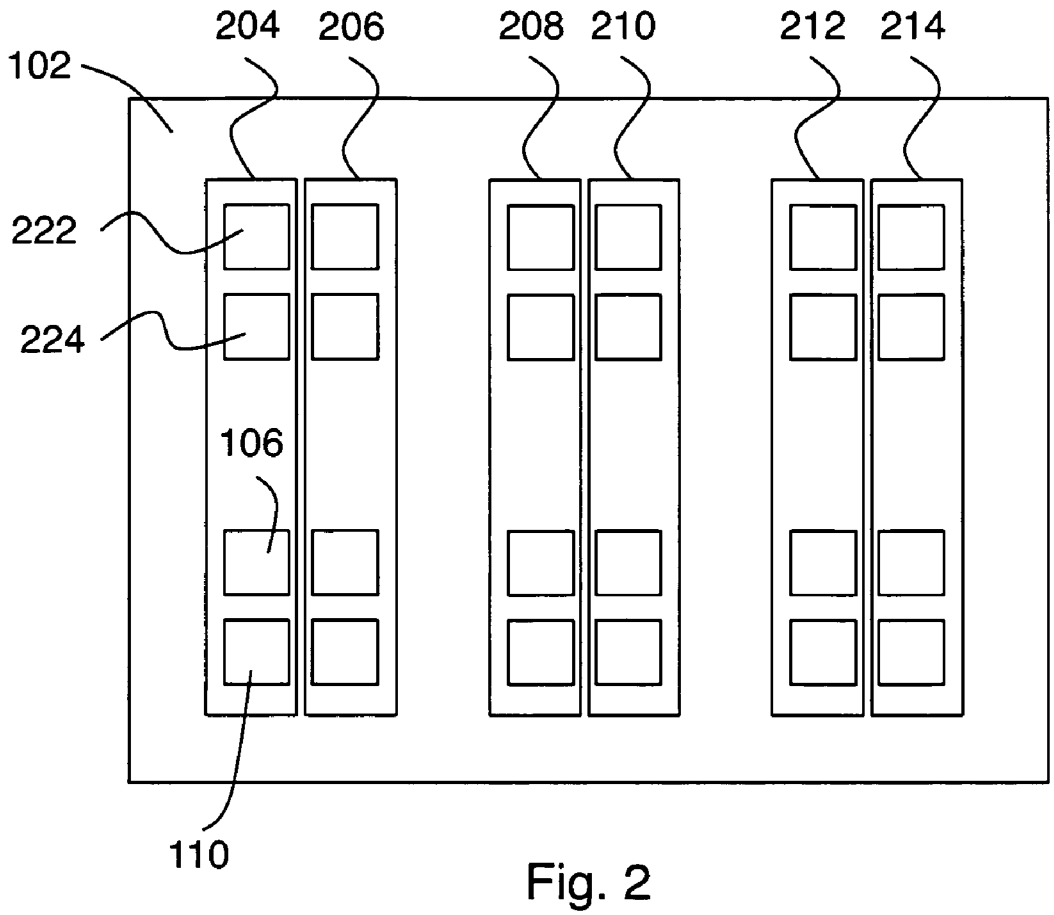
FIG. 2 show an example of electronic array reconfiguration according to an embodiment of the invention.

Flexible array re-configuration is a significant advantage of the present approach. The top view of FIG. 2 shows CMUT array 102 with a different assignment of cells to elements than on FIG. 1*a*. More specifically, in this example, element 204 on FIG. 2 includes cells 106, 110, 222, and 224, while element 104 on FIG. 1*a* includes cells 106, 108, 110, and 112. The allocation of cells to the other elements of the example of FIG. 2 (i.e., elements 206, 208, 210, 212, and 214) is also clearly different than shown on FIG. 1*a*. With the use of per-cell electrodes (as in FIG. 1*b*), a single CMUT array can be electronically reconfigured from a configuration like FIG. 1*a* to a configuration like FIG. 2 (or to any other assignment of cells to elements). This capability advantageously provides a great deal of flexibility in practice, since a single hardware CMUT array can have various electronically selected assignments of cells to elements.

Figure 3A:
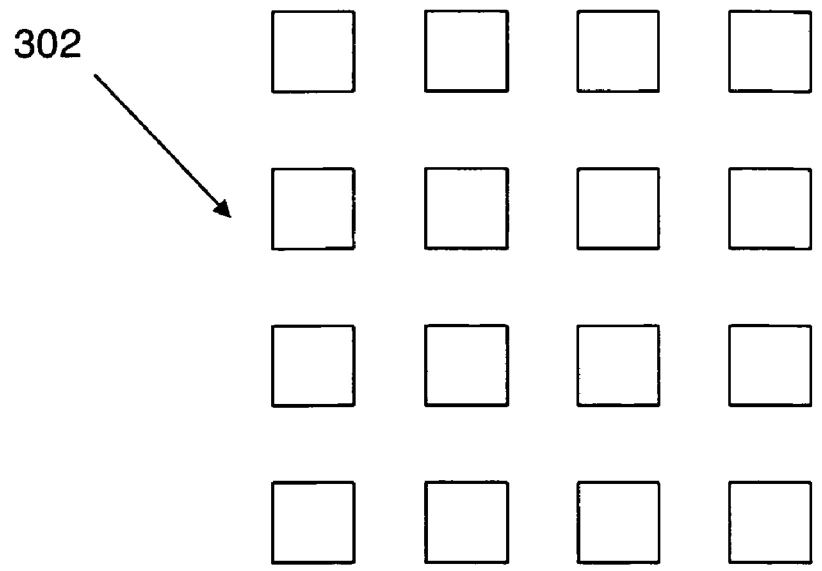
FIGS. 3*a-b* show another example of electronic array reconfiguration according to an embodiment of the invention.
Figure 3B:
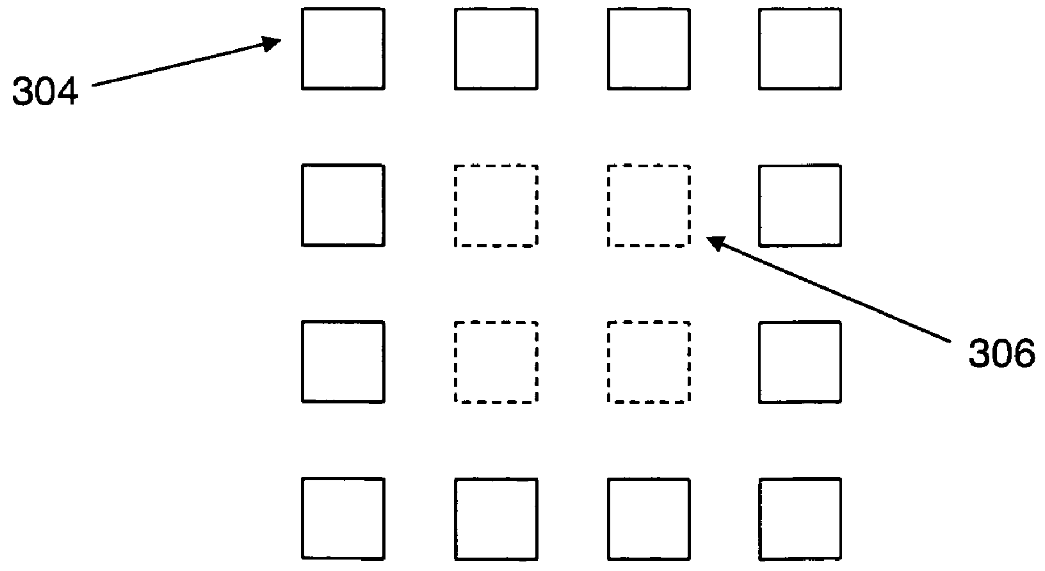

Configuration flexibility can also occur at the element level. For example, FIG. 3*a* shows a CMUT array 302 where all array elements are in the same mode (e.g., transmit or receive). FIG. 3*b* shows a CMUT array where some array elements 306 (dashed lines) are in one mode (e.g., transmit), and other array elements 304 (solid lines) are in another mode (e.g., receive). Here also, the assignment of modes to the elements (i.e., the element configuration) can be electronically configured by the IC substrate. Such configuration can be accomplished using per-cell and/or per element electrodes.

Figure 4A:
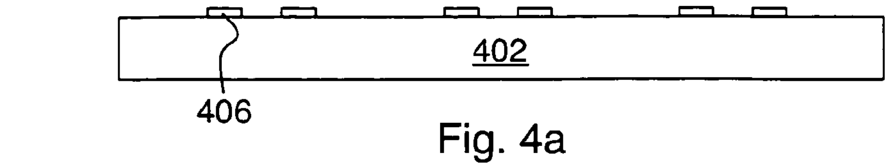
FIGS. 4*a-f* show an exemplary fabrication sequence.
Figure 4B:
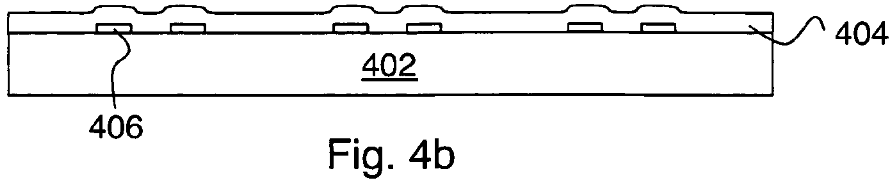
Figure 4C:
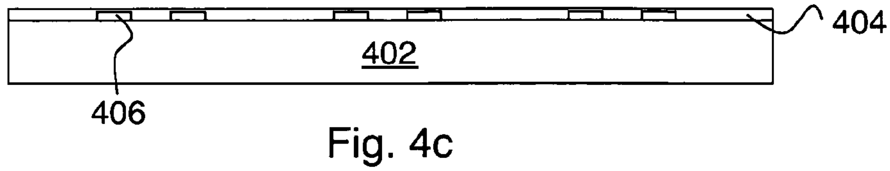

FIGS. 4*a-f* show an exemplary fabrication sequence. In this example, substrate 402 is an IC wafer including active electronic devices and having per-cell metal CMUT electrodes, one of which is labeled as 406. Substrate 402 can be a regular CMOS wafer, or a stack of previously bonded wafers that provide a 3D electronic structure. If necessary, the top surface of substrate 402 can be planarized (e.g., with chemical-mechanical polishing (CMP). To eliminate problems associated with dishing and/or erosion effects during the CMP, the passivation oxide can be deposited over the IC pads and can then be opened by lithography and etching (not shown). Fabrication of active electrical devices in substrate 402 can be done with conventional methods, and is therefore also not shown. FIG. 4*b* shows the result of depositing an insulator 404 on the structure of FIG. 4*a*. This step has two purposes. The first is to embed the metal electrode in a passivation layer. The second is to provide enough material on the wafer such that CMP can be employed to achieve a bondable (i.e., planar) surface. FIG. 4*c* shows the result of planarizing the structure of FIG. 4*b* (e.g., with CMP).

Figure 4D:
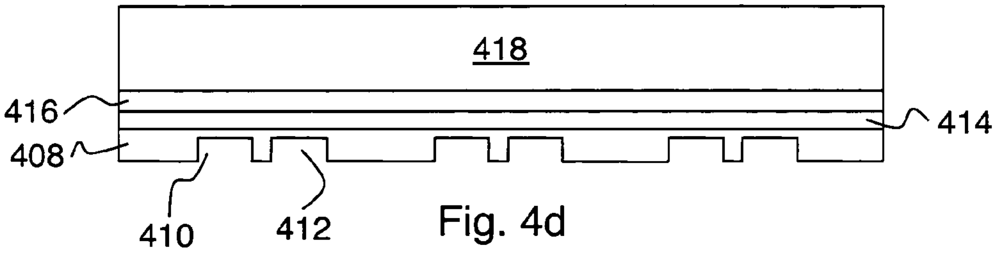
Figure 4E:
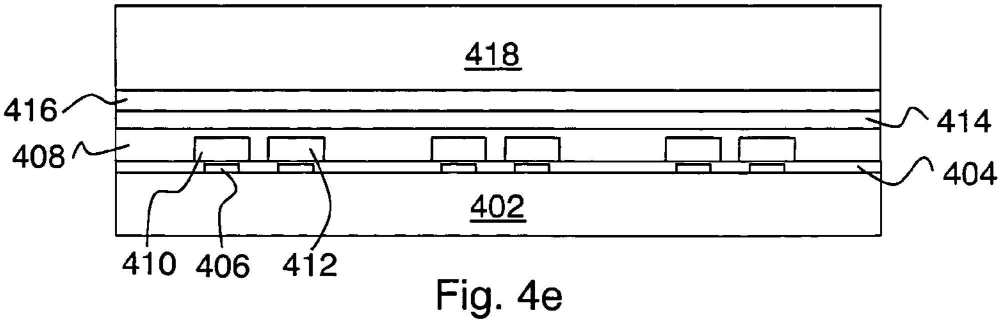
Figure 4F:
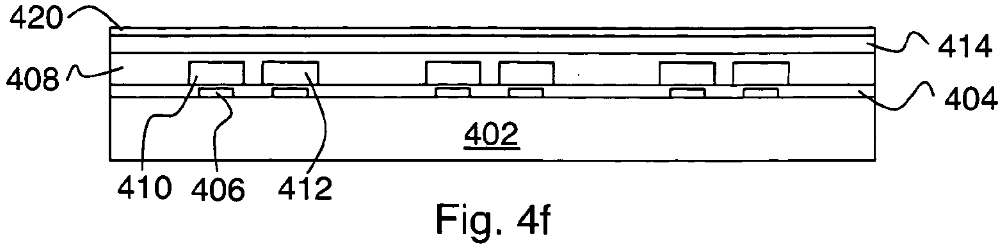

FIG. 4*d* shows a processed CMUT membrane wafer including a handle layer 418, a buried oxide layer 416, a silicon CMUT membrane layer 414, and a patterned insulator layer 408 (e.g., oxide) that includes features that will define the CMUT cells (two of which are referenced as 410 and 412). Fabrication of the CMUT cells in insulator layer 408 can be performed with conventional methods, and is therefore not shown. FIG. 4*e* shows the result of low-temperature bonding the CMUT membrane wafer of FIG. 4*d* to the planarized substrate of FIG. 4*c*. Preferably, the low-temperature wafer bonding process requires no processing or annealing temperature greater than 450° C. For proper alignment, a standard alignment bonder that supports vacuum bonding can be used for this step. State of the art alignment bonding tools provide sub-micron alignment accuracy, which is sufficient even for high frequency CMUT arrays. FIG. 4*f* shows the result of removing the handle layer 418 and buried oxide layer 416 from the structure of FIG. 4*e* (e.g., with grinding and/or etching), followed by deposition of the common top CMUT electrode 420. Preferably, top CMUT electrode 420, which acts as the ground electrode for the entire CMUT array, is electrically connected to IC substrate 402. For example, via holes can be etched in layers 414 and 408 after removal of layers 416 and 418 and prior to deposition of layer 420 to expose ground contacts on IC substrate 402. Deposition of metal electrode 420 then also results in the formation of a vertical connection from electrode 420 to substrate 402. These steps are well known in the art, and so are not shown here. In the resulting structure, CMUT layer 414 provides the CMUT membrane for each cell of the array.

The low temperature bonding process can be either a direct bonding process, or it can make use of one or more intermediate bonding layers. Suitable direct bonding processes include but are not limited to: anodic bonding, fusion bonding, plasma assisted fusion bonding, and chemically assisted fusion bonding (e.g., as described in US 2004/0235266, which is hereby incorporated by reference in its entirety). In one example, ammonium hydroxide can be used for chemical activation. Suitable intermediate layer bonding processes include but are not limited to: glass frit bonding, solder bonding, eutectic bonding, thermal compression bonding, and polymer bonding. One example of intermediate layer bonding is metal to metal bonding using one or more metal intermediate layers.

Figure 5:
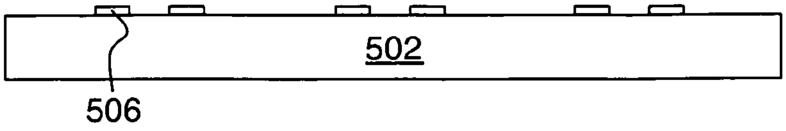
FIG. 5 shows an alternative approach for providing CMUT electrodes on the IC substrate.

Various fabrication alternatives are possible. FIG. 5 shows an alternative approach for providing CMUT electrodes on the IC substrate. In this variation an IC substrate 502 includes active electronic devices. CMUT cell electrodes (one of which is referenced as 506) are fabricated using a lift-off process. Lift-off is a standard process, so these steps are not shown. The resulting substrate wafer can be used instead of the wafer of FIG. 4*c* in the sequence of FIGS. 4*e-f.*

Figure 6:
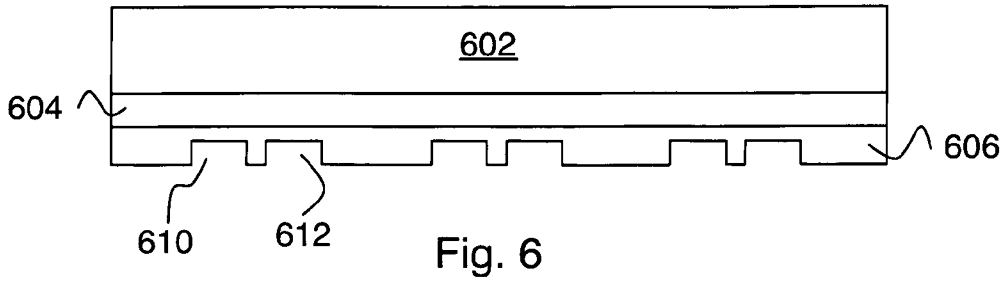
FIG. 6 shows a first alternative approach for providing the CMUT membrane wafer.

FIG. 6 shows a first alternative approach for providing the CMUT membrane wafer. In this alternative, the CMUT membrane wafer includes a handle layer 602, and buried oxide layer 604, and a patterned CMUT membrane layer 606 including cell features, two of which are referenced as 610 and 612. This patterning can be done with standard techniques, such as liquid etching, plasma etching, or double oxidation techniques. The resulting CMUT membrane wafer can be used instead of the CMUT membrane wafer of FIG. 4*d* in the sequence of FIGS. 4*e-f.* In this example, bonding would be between oxide and silicon, as opposed to the oxide to oxide bonding of previous examples. Although the fabrication sequence of this example may be somewhat simpler than if patterned oxide is used to form the CMUT cells, the use of a patterned active layer to form CMUT cells can result in higher parasitics and reduced breakdown performance.

Figure 7:
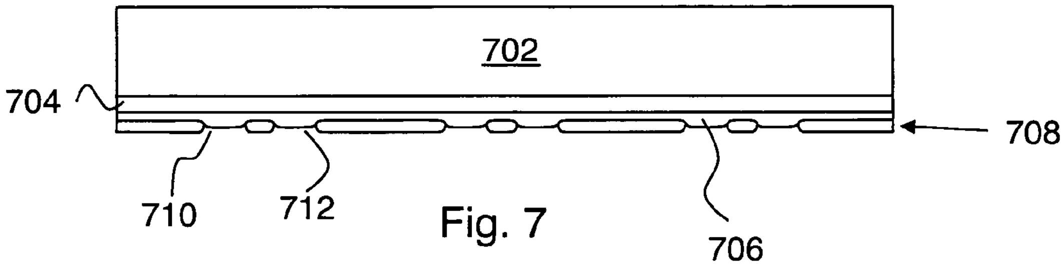
FIG. 7 shows a second alternative approach for providing the CMUT membrane wafer.

FIG. 7 shows a second alternative approach for providing the CMUT membrane wafer. In this alternative, local oxidation of silicon (LOCOS) is employed to form the CMUT cell features such as 710 and 712. The silicon CMUT membrane layer 706 is separated from the handle layer 702 by a buried oxide layer 704. Oxide features 708 are formed using LOCOS to define the CMUT features. The process steps for LOCOS are known in the art, so they are not shown in detail here. The resulting CMUT membrane wafer can be used instead of the CMUT membrane wafer of FIG. 4*d* in the sequence of FIGS. 4*a-f.* The use of LOCOS to define CMUT features can provide increased electrical breakdown voltage and reduced parasitic capacitance.

In the preceding example, aligned bonding was required, since CMUT cell/element features on the CMUT membrane wafer need to be aligned with the CMUT electrodes on the active substrate. FIGS. 8*a-i* show an exemplary fabrication sequence that requires no feature level aligned bonding steps (i.e., no need to align CMUT cell features to CMUT cell electrodes).

Figure 8A:
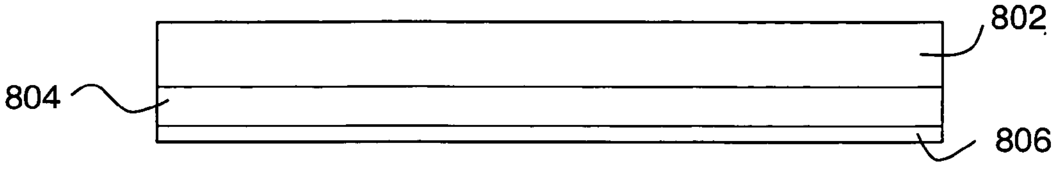
FIGS. 8*a-i* show an exemplary fabrication sequence that requires no aligned bonding steps.
Figure 8B:
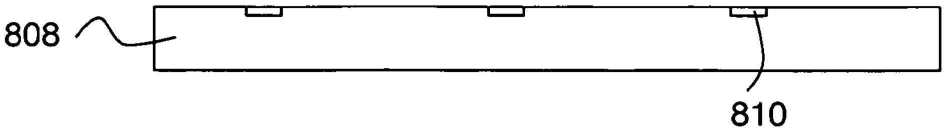
Figure 8C:
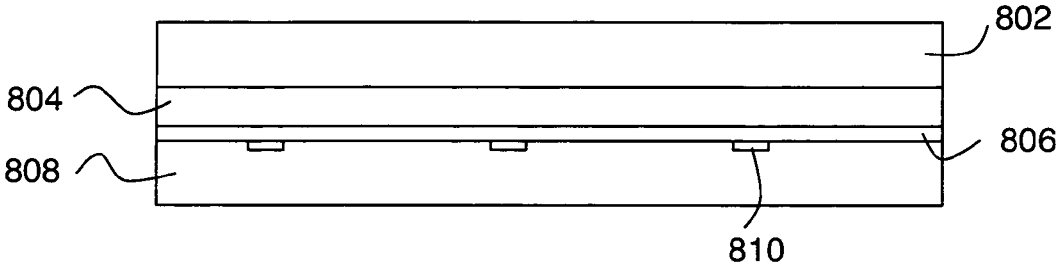
Figure 8D:
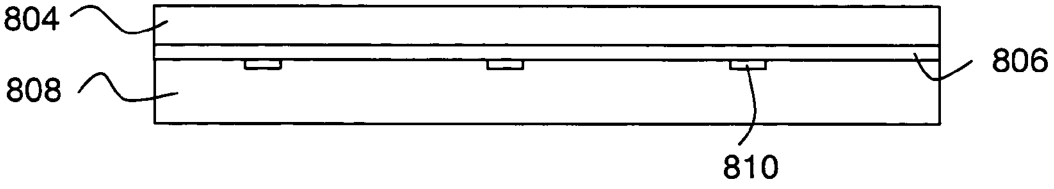
Figure 8E:
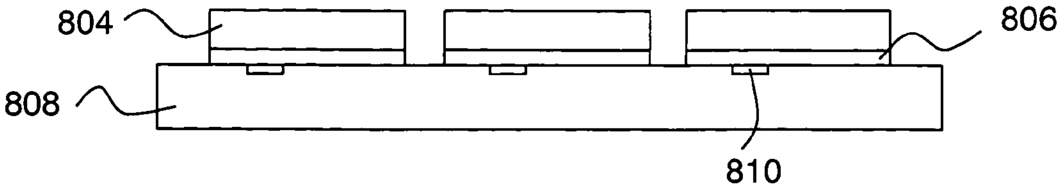
Figure 8F:
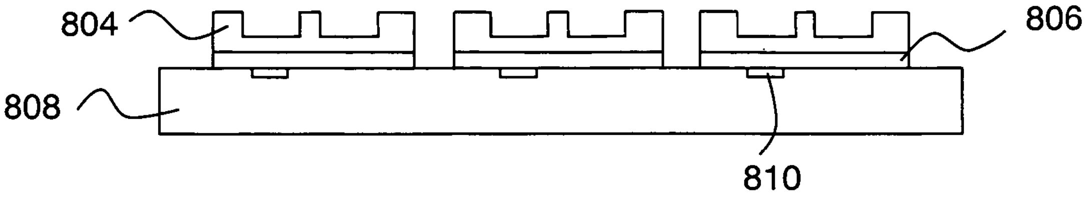
Figure 8G:
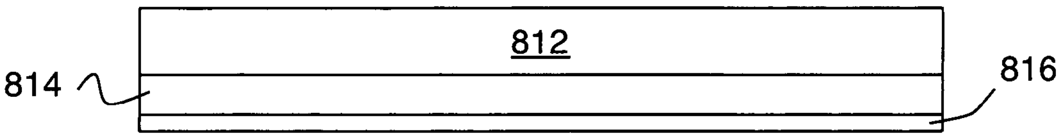
Figure 8H:
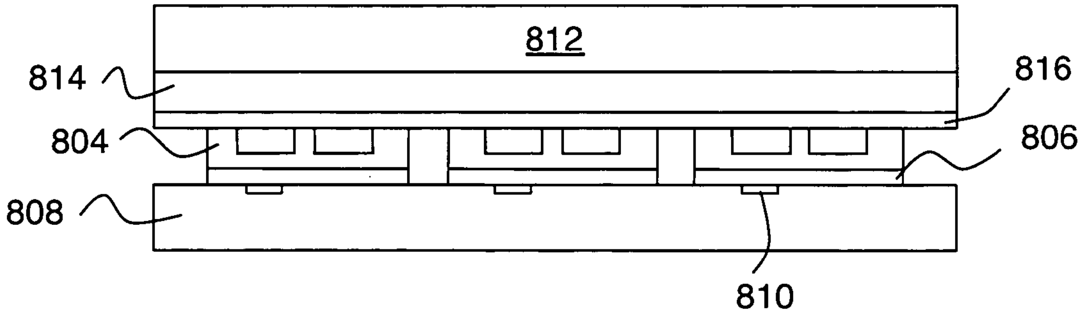
Figure 8I:
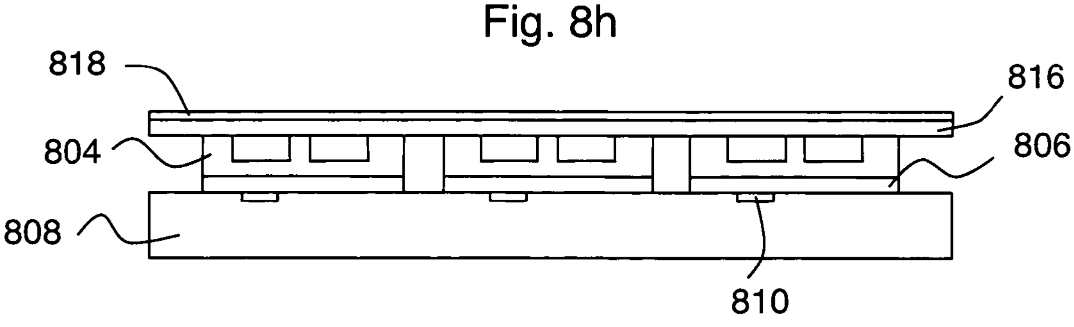

In this example, FIG. 8*a* shows an electrode wafer having a handle layer 802, a buried oxide layer 804, and a silicon electrode layer 806. Since electrode layer 806 ends up forming CMUT electrodes, it is preferred that layer 806 be doped to provide electrical conductivity. FIG. 8*b* shows a substrate wafer including active electrical devices, and having electrode contacts, one of which is labeled as 810. FIG. 8*c* shows the result of low-temperature bonding the electrode wafer of FIG. 8*b* to the substrate wafer of FIG. 8*a*. It is apparent that the horizontal alignment of this bonding step is not critical. FIG. 8*d* shows the result of removing handle layer 802 from the structure of FIG. 8*c*. FIG. 8*e* shows the result of patterning layers 804 and 806 of FIG. 8*d* to provide isolation between CMUT array elements. FIG. 8*f* shows the result of patterning layer 804 of FIG. 8*e* to define CMUT cell features. FIG. 8*g* shows an CMUT membrane wafer having a handle layer 812, a buried oxide layer 814, and a silicon CMUT membrane layer 816. FIG. 8*h* shows the result of low-temperature bonding the CMUT membrane wafer of FIG. 8*g* to the structure of FIG. 8*f.* It is apparent that the horizontal alignment of this bonding step is also not critical. FIG. 8*i* shows the result of removing handle layer 812 and buried oxide layer 814 from the structure of FIG. 8*h*, followed by deposition of common CMUT top electrode 818. In this example, two bonding steps are required, but no feature level horizontal alignment is required for either of these bonding steps.

The preceding description has been by way of example as opposed to limitation. Specific materials and/or process steps are not critical in practicing the invention, with the exception of the use of low temperature wafer bonding. For example, in the given fabrication examples, silicon on insulator (SOI) wafers are employed as the CMUT membrane wafer. Use of such wafers is preferred, because they provide excellent control of CMUT membrane layer thickness. However, alternative approaches can also be taken for providing the CMUT membrane, such as a standard silicon wafer polished to the desired thickness before or after the bonding step, or other CMUT membrane layer materials, such as silicon nitride, silicon carbide, or diamond, etc.

The invention claimed is:

1. A capacitive micromachined ultrasonic transducer (CMUT) array comprising:
- an integrated circuit (IC) substrate including one or more active electrical devices; and
- a CMUT membrane layer including membranes for each transducer element of said CMUT array;
- wherein said CMUT membrane layer is attached to said IC substrate by a method that includes low-temperature wafer bonding performed after said active electrical devices are present in said substrate.

2. The CMUT array of claim 1, wherein each transducer element of said array includes one or more CMUT cells, and wherein said IC substrate provides separate electrical cell electrodes for each CMUT cell of said array.

3. The CMUT array of claim 2, wherein an assignment of said cells to said transducer elements is configured to be electrically configured by said IC substrate.

4. The CMUT array of claim 1, wherein each transducer element of said array includes one or more CMUT cells, and wherein said IC substrate provides an element electrode for each transducer element, wherein each of said element electrodes is a collective electrode for all cells of the corresponding transducer element.

5. The CMUT array of claim 4, wherein a configuration of said transducer elements in said CMUT array is configured to be electrically configured by said IC substrate.

6. The CMUT array of claim 1, wherein said IC substrate comprises CMOS circuitry.

7. A method of making a capacitive micromachined ultrasonic transducer (CMUT) array, the method comprising:
- providing a substrate;
- fabricating one or more active electrical devices on said substrate to provide an integrated circuit (IC) substrate;
- providing a CMUT membrane wafer including a CMUT membrane layer; and
- bonding said CMUT membrane wafer to said IC substrate using a low-temperature wafer bonding process;
- wherein said CMUT membrane layer includes membranes for each transducer of said CMUT array.

8. The method of claim 7, wherein said low-temperature wafer bonding process requires no processing or annealing temperature greater than 450° C.

9. The method of claim 7, wherein each transducer element of said array includes one or more CMUT cells, and further comprising fabricating separate cell electrodes for each of said CMUT cells on said substrate.

10. The method of claim 7, wherein each transducer element of said array includes one or more CMUT cells, and further comprising fabricating element electrodes for each of said transducer elements on said substrate, wherein each of said element electrodes is a collective electrode for all cells of the corresponding transducer element.

11. The method of claim 7, further comprising fabricating CMUT electrodes on said substrate by depositing an insulator on top of metal electrodes, followed by planarizing the substrate.

12. The method of claim 7, further comprising fabricating CMUT electrodes on said substrate by depositing metal on a planarized substrate using a lift-off process.

13. The method of claim 7, further comprising fabricating CMUT electrodes on said substrate by performing a non-aligned bond of a semiconductor electrode layer to said substrate with a low-temperature bonding process, followed by patterning said electrode layer to form electrodes.

14. The method of claim 7, further comprising defining CMUT cells in said CMUT membrane wafer via local oxidation of silicon.

15. The method of claim 7, further comprising defining CMUT cells in said CMUT membrane wafer via deposition of an insulator followed by patterning said insulator.

16. The method of claim 7, further comprising defining CMUT cells in said CMUT membrane wafer via patterning said CMUT membrane layer.

17. The method of claim 7, wherein said low-temperature wafer bonding process is a direct bonding process.

18. The method of claim 7, wherein said low-temperature wafer bonding process makes use of one or more intermediate bonding layers.

19. The method of claim 7, wherein said low-temperature wafer bonding process comprises a bonding process selected from the group consisting of: anodic bonding, fusion bonding, plasma assisted fusion bonding, chemically assisted fusion bonding, glass frit bonding, solder bonding, eutectic bonding, thermal compression bonding, and polymer bonding.

20. The method of claim 7, wherein no feature-level horizontal alignment is required for said bonding.

* * * * *